US 6,640,704 B2

(12) United States Patent
Siebolds et al.

(10) Patent No.: US 6,640,704 B2
(45) Date of Patent: Nov. 4, 2003

(54) METHOD AND DEVICE FOR BALANCING ROTATING BODIES

(75) Inventors: Heinz Siebolds, Kiel (DE); Burkhard Paasch, Wahlstorf (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 36 days.

(21) Appl. No.: 09/928,012

(22) Filed: Aug. 10, 2001

(65) Prior Publication Data
US 2002/0020315 A1 Feb. 21, 2002

(30) Foreign Application Priority Data

Aug. 10, 2000 (DE) .............................. 100 39 865

(51) Int. Cl.⁷ .............................. F16F 15/34; F16F 15/32
(52) U.S. Cl. .................. 101/216; 101/494; 74/573 R
(58) Field of Search .............................. 74/573 R, 574; 101/216, 494

(56) References Cited

U.S. PATENT DOCUMENTS

| 1,158,712 A | | 11/1915 | Nichols ................... 74/573 R |
| 1,218,689 A | | 3/1917 | Nichols ................... 74/573 R |
| 2,097,894 A | | 11/1937 | Roche ..................... 451/343 |
| 2,895,766 A | | 7/1959 | Leopold, Jr. ............... 301/5.22 |
| 3,332,174 A | | 7/1967 | Behm ..................... 451/343 |
| 3,736,811 A | | 6/1973 | Neary ..................... 74/573 R |
| 4,117,742 A | * | 10/1978 | Stein ..................... 74/573 R |
| 4,842,485 A | * | 6/1989 | Barber .................... 416/144 |
| 5,074,723 A | | 12/1991 | Massa et al. .............. 409/131 |
| 5,207,634 A | * | 5/1993 | Greenstein ................ 494/10 |
| 5,738,013 A | * | 4/1998 | Kellett ................... 101/463.1 |
| 5,813,346 A | | 9/1998 | Solomon .................. 101/483 |
| 6,082,186 A | | 7/2000 | Detwiler .................. 73/66 |
| 6,116,160 A | * | 9/2000 | Burnett et al. ............ 101/378 |

FOREIGN PATENT DOCUMENTS

| DE | 1 792 413 | | 7/1959 | |
| DE | 1 074 442 | | 1/1960 | |
| DE | 1 806 011 | | 2/1960 | |
| DE | 37 851 | | 5/1965 | |
| DE | 2 007 628 | | 6/1983 | |
| DE | 270 136 A1 | | 7/1989 | |
| DE | 199 20 699 A1 | | 12/2000 | |
| JP | 56153956 A | * | 11/1981 | .......... H02K/15/16 |
| JP | 2000112141 A | * | 4/2000 | ............ G03F/7/24 |
| WO | WO 90/11862 | | 10/1990 | |

OTHER PUBLICATIONS

Machine translation of JP 2000112141 from the Japanese Patent Office website.*

* cited by examiner

Primary Examiner—Daniel J. Colilla
(74) Attorney, Agent, or Firm—Laurence A. Greenberg; Werner H. Stemer; Gregory L. Mayback

(57) ABSTRACT

The method and the device provide for the balancing of rotating bodies, in particular for balancing the drum of a reproduction unit such as a roller of a printing plate exposure device. At least one weight element is provided as a balancing element that can be repositioned along a predetermined movement path, especially a movement path running at a constant radial distance from the axis of rotation of the rotating body. The weight element compensates for imbalances and it can be fixed in different balancing positions by interlocking engagement.

28 Claims, 3 Drawing Sheets

METHOD AND DEVICE FOR BALANCING ROTATING BODIES

BACKGROUND OF THE INVENTION

1. Field of the Invention

The invention relates to a method for balancing rotating bodies, in particular for balancing the drum of a reproduction unit, especially a printing plate exposure device. At least one weight element is repositioned along a predetermined movement path, especially a movement path running at a constant radial distance from the axis of rotation of the rotating body.

The invention further relates to a device for the balancing of rotating bodies, and is particularly applicable to implementing the aforementioned method.

A method of the generic type and a device intended therefor are disclosed in U.S. Pat. No. 5,813,346.

The patent document is concerned in particular with the need to balance the drum of a printing plate exposure device by means of weight elements, before it is set in rotation for the exposure or inscription of the newly mounted printing plate, in order to compensate for imbalances produced by the intrinsic weight of the printing plate and its sometimes incomplete and uneven circumferential distribution. It may also be the case that a plurality of printing plates are fitted to a drum. To solve this problem, the U.S. patent proposes to displace counterweight elements, as necessary, along a predetermined movement path and in this way to redistribute the weight elements. Although for this purpose the weight elements are to be displaceable, it is intended that they be fixable in their respective, selected balancing positions purely by the force of friction.

SUMMARY OF THE INVENTION

It is accordingly an object of the invention to provide a method and a device for balancing rotating bodies, which overcome the above-mentioned disadvantages of the heretoforeknown devices and methods of this general type and which improve the reliability and security of the weight element fixing while retaining an equally simple facility for the repositioning of the weight elements.

With the foregoing and other objects in view there is provided, in accordance with the invention, a method of balancing a rotating body, which comprises:

providing a rotating body with a given axis of rotation and having a predetermined movement path on the rotating body;

repositioning at least one weight element along the predetermined movement path; and selectively fixing the weight element in a balancing position by means of interlocking engagement.

Advantageously, the predetermined movement path extends at a constant radial distance from the axis of rotation of the rotating body. The invention is particularly suitable in the context of a roller for a reproduction unit, such as a roller of a printing plate exposure device.

There is also provided, in accordance with the invention, a balancing assembly, comprising:

a rotating body having a defined axis of rotation and formed with a predetermined movement path;

at least one weight element positionable along the predetermined movement path and selectively fixable in a plurality of balancing positions by interlocking engagement with the rotating body.

In other words, the objects of the invention are satisfied by a method and a device in which the weight element (also referred to as a mass element) is fixed in different balancing positions by means of interlocking engagement.

According to the invention, therefore, for fixing the weight element the interlocking engagement is preferred to a frictional engagement. The invention creates the necessary prerequisites for a sufficient number of selectable balancing positions for such a fixing. In practice, two weight elements for each end of the rotating body are generally necessary and sufficient to correct imbalances, since this can by and large compensate for moments occurring due to imbalances, that is to say both untrue running about the axis of rotation and any wobbling movement of the axis of rotation in its bearings.

In order that the weight element may be easily shifted into another position, despite the interlocking engagement of the weight element, it is proposed according to a development of the invention that for onward movement the weight element need only be disengaged from one interlocking engagement and subsequently re-engaged in a new interlocking engagement.

In so doing, engagement occurs, in particular, in a radial direction, and preferably in the direction of the centrifugal force, so that this reinforces the engagement rather than possibly weakening it. In addition the weight element may be loaded, especially spring-loaded, in the direction of engagement.

In accordance with an added feature of the invention, despite the desired interlocking engagement a virtually continuous repositioning of the weight element is possible in each of the balancing positions by providing a bar pattern for the interlocking engagement running along the movement path, the bar pattern gradations of which can be made correspondingly smaller for a larger number of balancing positions. In concrete terms this can be achieved, for example, by means of a bar pattern formed as toothing or knurling.

A device according to the invention for the balancing of rotating bodies of the generic type stated in the introductory part, especially for performing the method according to the invention, is wherein in its independent solution of the stated problem in that the weight element can be fixed in different balancing positions by means of interlocking engagement. This results in the advantages already described in the method according to the invention.

In particular, it is proposed according to developments of The assembly according to the invention that for onward movement along the movement path the weight element should have only to be disengaged from a balancing position and subsequently re-engaged in the new balancing position, especially with the assistance of spring loading, which like the engagement is preferably directed radially and in the direction of the centrifugal force.

In this way the centrifugal force reinforces the interlocking engagement.

In accordance with another development of the invention, the weight element or each weight element be equipped with at least one roller element to reduce friction. This can be achieved directly or indirectly, by supporting a spring element, such as a leaf spring, a leg spring or the like, for example, which exerts a load in the direction of engagement, on rollers or cupped rollers. An (additional) roller bearing in an axial direction can also be an advantage.

In order to permit fixing of the weight element or weight elements that is as unbroken and uniform as possible and virtually continuous along the movement path and thus obtain a finely adjusted and pre-calculable balancing, it is proposed according to the invention that interlocking elements for the weight element preferably form a regular bar pattern running along the movement path. This may be a toothing or a knurling, which can be readily introduced into the material used at a suitable point and over the proposed length using simple tooling. In this way, retrofitting to existing devices is also possible at no major expense. To do this, the measures proposed for realization of the invention can be provided in existing areas or can also be prefabricated, for example, in the area of disk elements or the like that are to be added, that is to say completed altogether as part of a retrofit unit, in principle ready for operation.

Where a toothing is used as interlock pattern for the weight element or weight elements, preferably on an outer rim with toothing directed radially inwards, the interlocking engagement must ensure, solely through the toothing angle and/or the height of the toothing, that the weight element is not also spontaneously displaced again as the rotating body rotates. In this example of an embodiment of the invention, only the said radial guiding and support for the weight element in respect of the interlocking engagement is first necessary.

The movement path is formed in particular by the defining of a bar pattern as guide way for the weight element, an interlocking engagement and fixing not necessarily being aligned in a radial direction to the axis of rotation, although the centrifugal force acting during the rotation must naturally always be absorbed. This is basically always possible, however, by means of suitable measures. According to the invention, however, preference is given to a purely mechanical solution, which is easier to construct and operate in terms of fixtures, especially when taking account of existing devices and copying movements, for example in a printing plate exposure device, and hence with a view to cost-effective and rapid retrofitting.

To this end, another development of the invention proposes that the guide way for the weight elements be designed as slotted rail or guide groove, for example with a T-shaped cross section open at its foot or with an L-shaped cross section. In this way, an axial immobilization of each weight element is achieved with additional interlocking by this cross-sectional shape. In the absence of such an interlocking engagement, magnets or similar attachment elements might, as already mentioned, also be used for securing the weight element axially at certain points.

A further development of the invention is wherein by a catching fixture for catching the weight element. Said catching fixture is intended to take the respective weight element from the present interlocking engagement, to move it along the movement path into another balancing position and there to re-establish an interlocking engagement.

The movements necessary for this purpose should preferably be feasible with as few, economical component motions as possible. In particular, the movement along the movement path, preferably describing a circular orbit about the axis of rotation, may be achieved by turning of the rotating body about its axis of rotation, the fixed catching device, for example, catching the respective weight element and immobilizing it whilst the body turns away beneath this in one or the other direction of rotation. In the case of a closed movement path only one direction of rotation is necessary.

Even though the weight element is intended preferably to engage radially in an interlocking engagement assisted by centrifugal force and to be likewise disengaged in a radial direction, such a movement is easier to accomplish in terms of fixtures by a catching fixture moving in an axial direction, the catching member and the weight element, as proposed in a development of The assembly according to the invention, having interacting inclined faces, which are capable of converting an axial movement into a radial movement.

In this case the catching member, for example, in an especially simple and appropriate embodiment, may be a stud or a pin, which is arranged axially parallel with the axis of rotation and to which a bore or a blind hole in the weight element is assigned, for its introduction. The catching member and the weight element are preferably then arranged with a radial offset in relation to one another, which is less than the radius of the not necessarily blind hole in the weight element, so that in an axial movement the pin encounters the open cross-section of the blind hole, and the offset is eliminated by the interacting inclined faces as the pin penetrates deeper, the blind hole and hence the weight element being impelled into a radial movement and thereby disengaging from an interlocking engagement. When the pin is withdrawn from the blind hole, the weight element is re-engaged in an interlocking engagement, preferably under the action of a spring force, in the process re-establishing the radial offset between the blind hole and the pin. If the pin and the blind hole are of circular design, the inclined faces of these two elements may be designed as conical tapers.

An axial movement can also be alternatively converted, for example, into a perpendicular, especially a radial or tangential component motion, in that the weight element or a section thereof is expanded by the introduction of an element and contracted again by withdrawal of said element. This can also serve for engagement in an interlocking engagement and disengagement from the said interlocking engagement.

Other features which are considered as characteristic for the invention are set forth in the appended claims.

Although the invention is illustrated and described herein as embodied in a method and device for the balancing of rotating bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
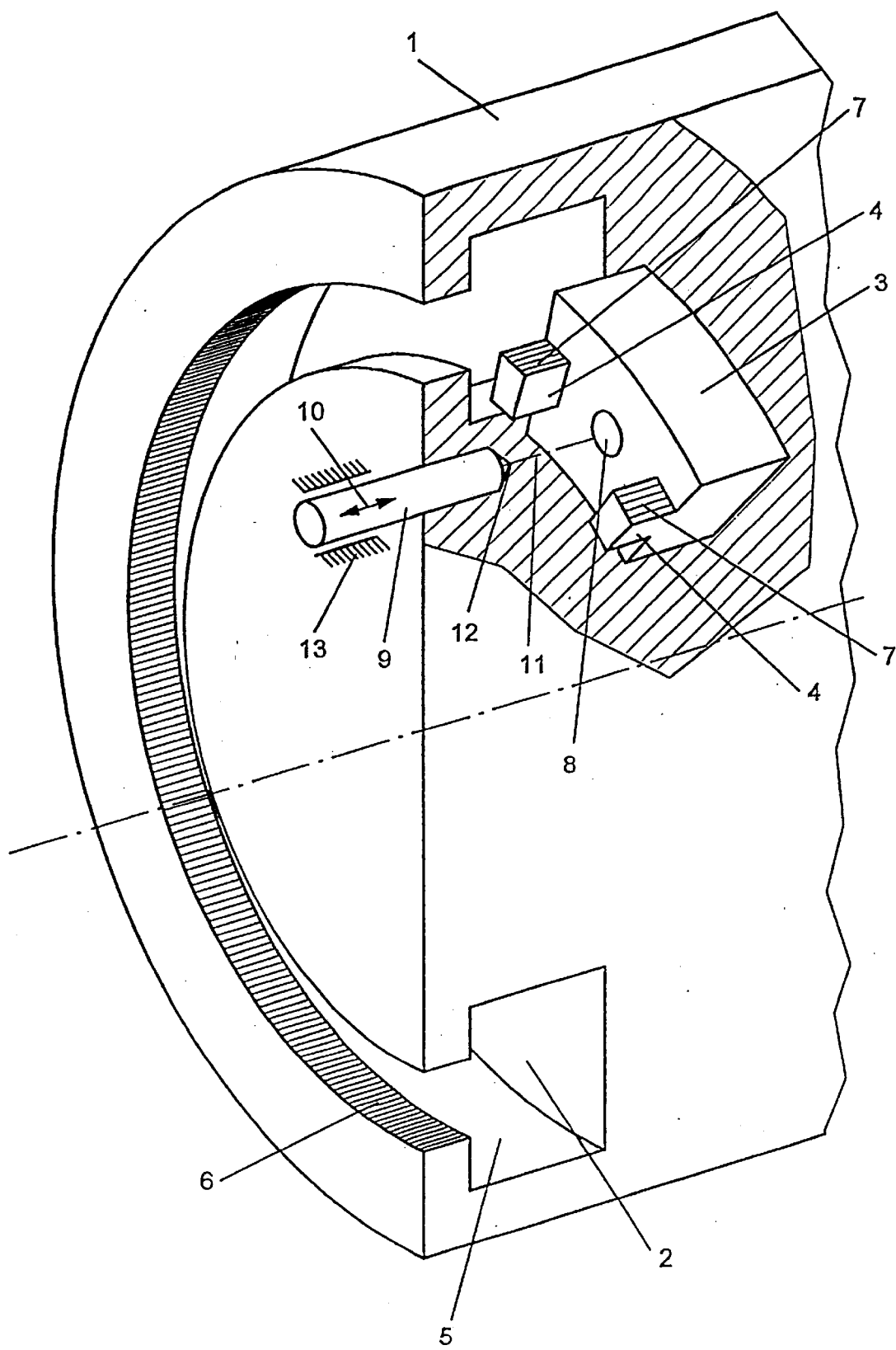
FIG. 1 is a broken-away, partly exploded, perspective view of the front face of a rotating body with a device according to the invention.

Referring now to the figures of the drawing in detail and first, particularly, to FIG. 1 thereof, there is shown an end face section of a roller-shaped, rotating body 1. By way of the example, the roller may be a drum of a printing plate exposure device.

In the exemplary embodiment, represented merely in schematic form, a T-slot 2 is machined in the face of the body 1. The slot 2 serves as guide rail for a weight element 3 or weight elements, which can be introduced into the T-slot 2 and displaced along the T-slot 2 in order to serve as counterweights for the elimination of imbalances of the body 1 as it rotates about its longitudinal axis. The T-slot 2 or a similar guide way might also alternatively be an integral part of a separate disk, which can be attached to the end face of the body, which might be more cost-effective to manufacture.

The weight element 3 has guide shoulders 4, which are guided in and along the slot opening 5 of the T-slot 2 serving as guide slot. On its radially outer side relative to the longitudinal axis or axis of rotation of the body 1, the slot opening 5 has a knurling or a toothed rim with a toothing 6 (only diagrammatically indicated), which serves as interlocking elements, extending along the T-slot 2, for the weight element 3, especially for the guide shoulders 4 of the weight element 3, which are formed with corresponding, matching toothings 7.

The weight element 3 moreover contains a blind hole 8, into which a pin 9 of a catching device, which is fixed outside the body and is not represented in more detail in the drawing, can be inserted, the pin 9 being capable of a reciprocating movement in the direction of the double arrow 10, axially parallel with the longitudinal axis of the body 1. In this case the pin 9 is aimed in the direction of a dashed line 11 into the blind hole 8. At its free end the pin 9 has a conical taper 12, which interacts with a matching conical taper at the bottom of the blind hole 8, in order to impart a radially inwards movement to the pin 9 and the weight element 3 when the former is introduced into the blind hole 8. At the same time the pin itself is supported in the fixed catching device so that it can only move along the double arrow 10, which is indicated by a corresponding bearing bore or a bearing lining 13. For movement of the pin 9 in the direction of the double arrow 10, a suitable drive is provided, which for the sake of clarity is likewise not represented in the drawing.

Figure 2:
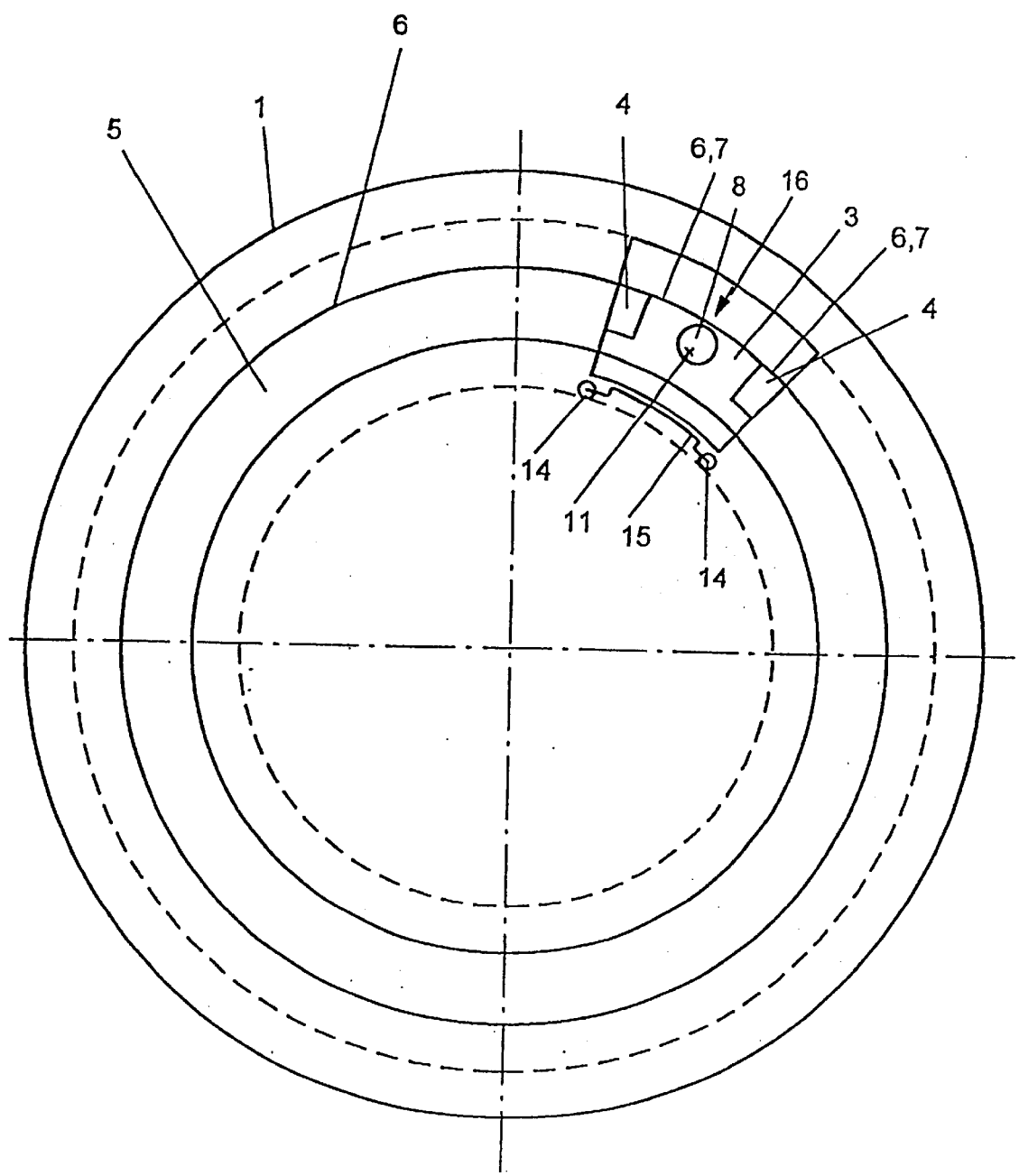
FIG. 2 is a front view of the end face according to FIG. 1.

FIG. 2 shows a front view of the end face section according to FIG. 1. Identical components are denoted by the same reference numbers as in FIG. 1.

It can also be gathered from FIG. 1 and FIG. 2 that the weight element 3 is supported on the radially inner side wall of the T-slot 2 by a leaf spring 15 supported on rollers 14, the spring loading the weight element 3 radially outwards and pressing the weight element 3 in toward the toothing 6. If the weight element is forcibly disengaged from its interlocking engagement with the toothing 6 against the force of this spring, that is in the direction of the arrow 16 in FIG. 2, the weight element 3 is easily displaced in the T-slot 2 on the rollers 14. This disengagement in the direction of the arrow 16 occurs, as already described with regard to FIG. 1, due to the introduction of the pin 9 into the blind hole 8. The entry point of the pin 9 into the blind hole 8 is marked by a cross on the line 11 in FIG. 2, from which the initial radial offset existing between the pin and the blind hole 8 can once again clearly be seen. As the pin 9 penetrates into the blind hole 8 and the weight element is disengaged from its interlocking engagement with the toothing 6 in the direction of the arrow 16, this offset is reduced until the weight element is freed for displacement in the T-slot 2 on the rollers 14.

For the weight element 3 to be displaced in the T-slot 2 it must be held only by the pin 9 of the fixed catching device, and the body 1 itself can then be driven to rotate slowly about its axis of rotation, so that the T-slot 2 therefore finally moves in relation to the weight element fixed by means of the pin 9.

Figure 3:
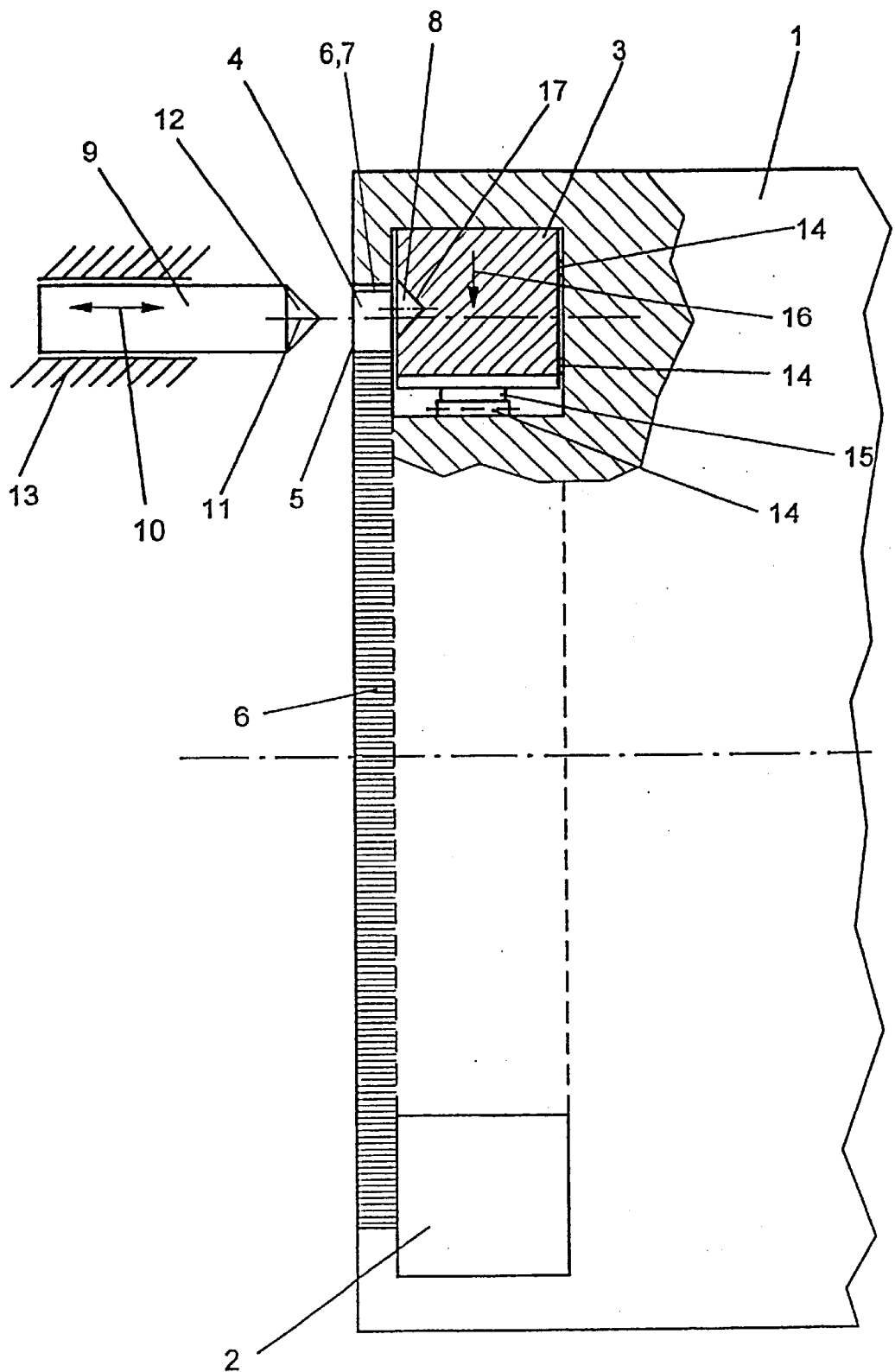
FIG. 3 is a sectional view of the end face area of FIG. 1.

FIG. 3, wherein the same components are again denoted by the same reference numbers as in FIGS. 1 and 2, shows a partial longitudinal section through the body 1. In this view, in particular, the arrangement of the pin 9 in its fixed liner 13 of a catching device and its radial offset in relation to the blind hole 8 of the weight element 3 are again discernible. The disengagement of the weight element 3 from its interlocking engagement with the toothing 6 and its re-engagement under the force of the leaf spring 15 are also more clearly revealed in this view.

In addition it can be seen that the weight element 3 is also supported in an axial direction by rollers 14 on the bottom of the T-slot 2.

Also discernible is the fact that the bottom of the blind hole 8 is also designed as a conical taper 17 matching the conical taper 12 of the pin 9.

It will be clear that in the figures described above only one exemplary embodiment is described which could be modified in many different respects without departing from the scope of the invention. The invention is therefore not confined to the exemplary embodiment represented in the drawing.

We claim:

1. A method of balancing a rotating body, which comprises:
providing a rotating body with a given axis of rotation and having a predetermined movement path on the rotating body;
repositioning at least one weight element along the predetermined movement path;
selectively fixing the weight element in a balancing position by means of interlocking engagement;
catching the weight element for moving along the predetermined movement path by a catching fixture; and
introducing a catching member into a blind hole formed in the weight element, the catching member and the blind hole being offset in relation to one another in a radial direction of the rotating body such that the offset is smaller than a radius of the blind hole.

2. The method according to claim 1, wherein the predetermined movement path extends at a constant radial distance from the axis of rotation of the rotating body.

3. The method according to claim 1, which comprises, for onward movement along the movement path, disengaging the weight element from the interlocking engagement and, for fixing the weight element in a balancing position, engaging the weight element in the interlocking engagement.

4. The method according to claim 3, wherein the fixing step comprises engaging the weight element in the interlocking engagement in a direction of the centrifugal force.

5. The method according to claim 1, wherein the fixing step comprises engaging the weight element in the interlocking engagement radially to the axis of rotation.

6. The method according to claim 1, which comprises loading the weight element in a direction of engagement.

7. The method according to claim 1, which comprises fixing the weight element by interlocking engagement in a uniform bar pattern running along the movement path.

8. The method according to claim 1, wherein the providing step comprises providing a roller of a reproduction unit and balancing the roller.

9. The method according to claim 1, wherein the providing step comprises providing a roller of a printing plate exposure device and balancing the roller.

10. A balancing assembly, comprising:
a rotating body having a defined axis of rotation and formed with a predetennined movement path;

at least one weight element having a blind hole formed therein, said weight element positioned along said predetermined movement path and selectively fixable in a plurality of balancing positions by interlocking engagement with said rotating body; and a catching fixture having a catching member for catching said weight element for movement along said predetermined movement path, said catching member being introduced into said blind hole said catching member and said blind hole are offset in relation to one another in a radial direction of said rotating body and said offset being smaller than a radius of said blind hole.

11. The assembly according to claim 10, wherein said rotating body is a roller of a reproduction unit.

12. The assembly according to claim 10, wherein said rotating body is a roller of a printing plate exposure device.

13. The assembly according to claim 10, wherein said movement path is defined at a constant radial distance from the axis of rotation of said rotating body.

14. The assembly according to claim 10, wherein, for onward movement along said movement path, said weight element is disengageable from the interlocking engagement and, for fixing in a balancing position, said weight element is engageable in the interlocking engagement.

15. The assembly according to claim 10, which comprises interlocking elements arranged to permit an interlocking engagement of said weight element (3) in a radial direction to said axis of rotation.

16. The assembly according to claim 15, wherein said interlocking elements are each disposed at said rotating body in a direction of a centrifugal force.

17. The assembly according to claim 10, which comprises a loading element for applying force to said weight element in a direction of engagement.

18. The assembly according to claim 17, wherein said loading element is a spring arranged on said weight element.

19. The assembly according to claim 18, which comprises a roller element provided for each said weight element for reducing friction.

20. The assembly according to claim 10, wherein interlocking elements for said weight element form a uniform bar pattern running along the movement path.

21. The assembly according to claim 20, wherein said uniform bar pattern is a pattern selected from the group consisting of toothing and knurling.

22. The assembly according to claim 10, wherein said movement path is a predefined guide for said at least one weight element.

23. The assembly according to claim 22, wherein said guide is a slotted rail.

24. The assembly according to claim 10, which comprises a means for interlocking engagement disposed in predetermined balancing positions for fixing said weight element in a direction axially parallel with said axis of rotation.

25. The assembly according to claim 10, which comprises a limiting member disposed in predetermined balancing positions for limiting said weight element in a direction axially parallel with said axis of rotation.

26. The assembly according to claim 10, wherein said catching fixture and said weight element are formed with interacting inclined faces, for converting a movement of a catching member in a direction axially parallel with said axis of rotation into a component motion of said weight element in a radial direction.

27. The assembly according to claim 10, wherein said catching member is a member selected from the group consisting of a stud and a pin.

28. The assembly according to claim 10, wherein said blind hole and said catching member are each formed with inclined faces each designed as conical tapers.

* * * * *